United States Patent [19]

Pagan

[11] Patent Number: 4,597,688
[45] Date of Patent: Jul. 1, 1986

[54] SUCKER ROD ASSEMBLY AND METHOD

[75] Inventor: Augustine J. Pagan, El Cajon, Calif.

[73] Assignee: Whittaker Corporation, Los Angeles, Calif.

[21] Appl. No.: 651,016

[22] Filed: Sep. 17, 1984

[51] Int. Cl.[4] .............................................. F16B 11/00
[52] U.S. Cl. ................................... 403/265; 403/268; 403/365; 156/289
[58] Field of Search ............... 403/265, 266, 267, 268, 403/365; 156/289, 294; 166/68

[56] References Cited

U.S. PATENT DOCUMENTS

| | | | |
|---|---|---|---|
| 2,829,503 | 4/1958 | Hayes | 403/379 X |
| 3,390,897 | 7/1968 | Moore | 403/379 X |
| 3,960,459 | 6/1976 | Hering et al. | 403/267 |
| 4,057,687 | 11/1977 | Willem | 403/267 X |
| 4,360,288 | 11/1982 | Rutledge et al. | 403/267 X |
| 4,401,396 | 8/1983 | McKay | 403/268 X |
| 4,430,018 | 2/1984 | Fischer | 403/268 |
| 4,475,839 | 10/1984 | Strandberg | 403/268 X |

FOREIGN PATENT DOCUMENTS 694240 12/1930 France .................... 403/365

Primary Examiner—Cornelius J. Husar
Assistant Examiner—Joseph A. Fischetti
Attorney, Agent, or Firm—Donald E. Nist

[57] ABSTRACT

An improved sucker rod assembly is provided for use in oil wells and the like. The assembly includes a sucker rod of fiberglass, carbon fibers, graphite fibers, plastic or the like and with a pair of end fittings secured to opposite ends thereof. Each fitting includes a rigid elongated casing of metal or the like having interior surfaces defining an open front end and a central cavity extending rearwardly from that front end, in which cavity one end of the sucker rod is disposed. The side portions of the interior surfaces of the casing are contoured to define with the side portions of the sucker rod end in the cavity a single, annular, elongated, tapered, frusto-conical or wedge-shaped space. An anchoring component substantially fills the space and bonds to the side portions of the rod to lock the rod end in the space and thereby secure the fitting to the rod. Preferably, the anchoring component has a narrower diameter at the front end than at the rear end thereof. The cavity preferably extends along the longitudinal centerline of the casing, with the anchoring component along substantially the length of the side portion of the rod end in the casing. The anchoring component may comprise bonding material which has been poured into the space and set in situ or may comprise a plurality of separate rigid inserts, the interior surfaces of which collectively define a central elongated passageway in which the rod end is received.

20 Claims, 7 Drawing Figures

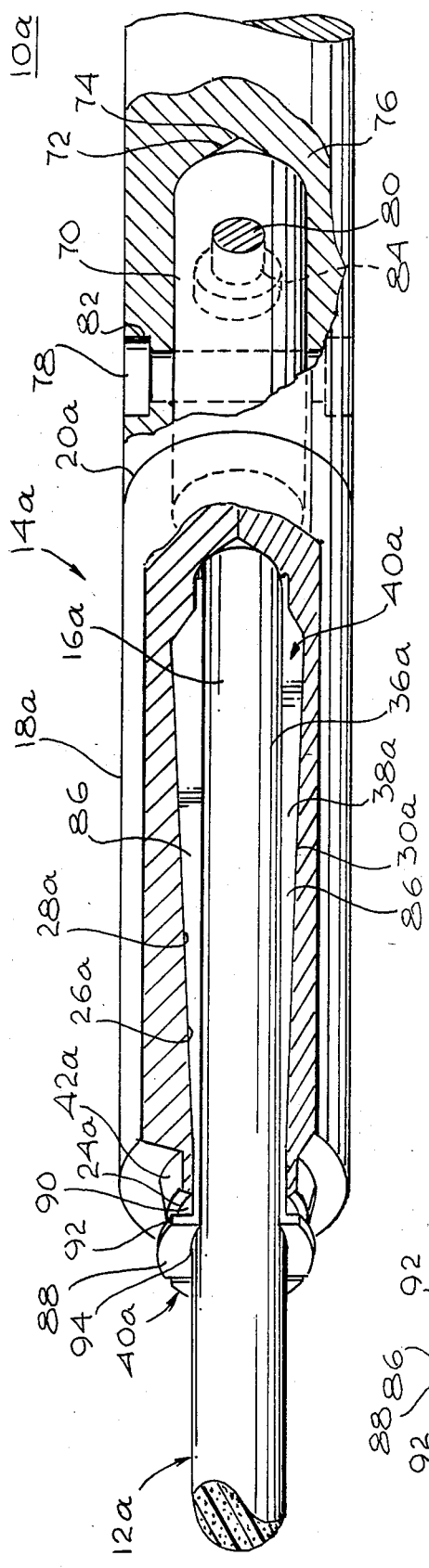
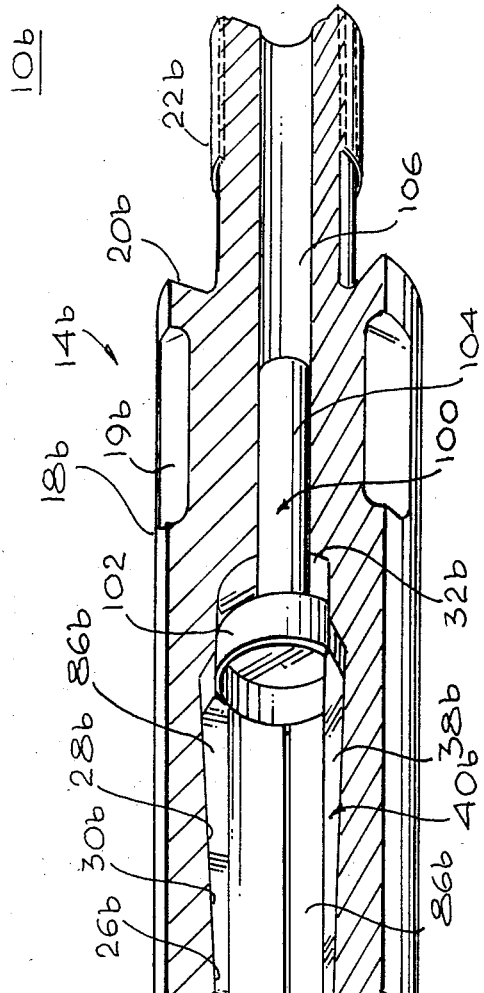
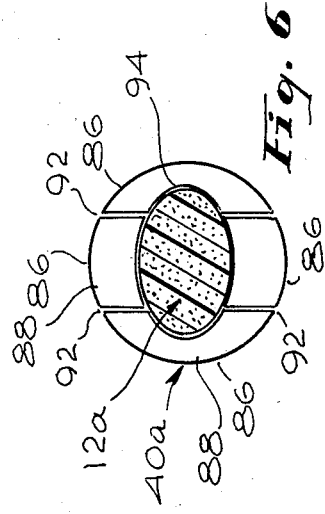
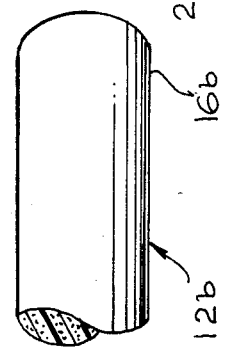

SUCKER ROD ASSEMBLY AND METHOD

BACKGROUND OF THE INVENTION

1. Field of the Invention

The present invention generally relates to well equipment and more particularly to an improved sucker rod assembly.

2. Prior Art

Conventional sucker rods are usually fabricated of metal in lengths of about 25 to 40 feet. These lengths are interconnected to form sucker rod strings useful for well pumping purposes. Because metal sucker rod strings are relatively heavy, recently efforts have been made toward developing and using sucker rods which include non-metallic components. For example, U.S. Pat. No. 3,212,582 discloses the use of plastic sucker rods; so also does U.S. Pat. No. 3,889,579. U.S. Pat. Nos. 4,360,288; 4,401,396, 4,024,913 and 4,416,329 also disclose non-metallic sucker rods. Certain of such non-metallic sucker rods have been provided in continuous lengths. See for example U.S. Pat. Nos. 4,416,329 and 3,889,579.

Difficulties have been encountered with non-metallic sucker rods whether of the continuous type or of the multiple interconnected type. In this regard, non-metallic sucker rods such as those made of plastic, fiberglass or other non-metallic fibrous compositions are relatively difficult to grip with end fittings without having the end fittings slip off or crush the rod ends. Additionally, since the rods flex, some difficulties have been encountered with so-called pinch-off of the rods at about the point of exit of the rod from the end fitting.

Various patents have been addressed to the provision of improved designs of metallic fittings used on non-metallic sucker rod ends; see for example U.S. Pat. Nos. 4,360,288 and 4,401,396. Certain end fittings for non-metallic sucker rods have been provided which include a plurality of internal steps or teeth formed by pouring molten potting material into configured end fitting cavities. Specially configuring the casing can be expensive and the results are variable. The potting material is set to hardness and bonds to the sucker rod exterior. The set potting compound may or may not bond to the interior surface of the fitting. Loosening of that bond can occur due to the shape of the set potting material, with subsequent slipping of the fitting and potting material from the rod, resulting in loss of the rod, interruption of well pumping activity, etc.

Accordingly, there is a need for an improved sucker rod assembly which employs a non-metallic sucker rod held by improved rod end fittings. The end fittings should securely hold the rod ends without crushing or pinch-off for improved sucker rod longevity. The assembly should have improved load-bearing characteristics and efficiency.

SUMMARY OF THE INVENTION

The improved sucker rod assembly of the present invention satisfies all the foregoing needs. The assembly is substantially as set forth in the Abstract above. Thus, it comprises a sucker rod which may be of any suitable length, usually about 25-40 feet, although it could also be a continuous sucker rod. The rod preferably is fabricated of non-metallic components such as fiberglass, carbon fiber, graphite fiber, plastic and/or combinations thereof. The sucker rod can be of any suitable cross-sectional dimensions and shape. Its opposite ends bear fittings securely locked thereto in a manner which prevents the fittings from crushing the sucker rod ends. Each fitting includes a rigid elongated casing having interior surfaces defining an open front end and a cavity extending rearwardly from the front end, preferably along the longitudinal centerline of the casing. The sucker rod end is disposed in the cavity. The side portions of the interior surfaces of the casing are contoured to define with the side portions of the sucker rod end in the cavity a single annular elongated tapered wedge-shaped space which is filled with anchoring means bonded to the side portions of the rod end and to lock it in place in the casing. The anchoring means may comprise potting material which has been poured into the space and set in situ to the solid state. The anchoring means can alternatively comprise a plurality, for example three, separate rigid inserts adapted to abut each other, the interior surfaces of which collectively define a central elongated passageway in which the rod end is received. The interior surfaces of the inserts are tightly bonded to the side portions of the rod and the inserts are also bonded to each other along the contact lines therebetween to form a unitary structure.

The inserts fill the contoured annular space. When such inserts are used, preferably the interior surfaces of the casing are first coated with a release agent, after which the inserts are inserted into the cavity, liquid bonding agent is poured in the passageway and the rod end is inserted in the passageway so the bonding agent spreads over the side surfaces thereof and into the juncture lines between the inserts. The inserts are curved and elongated and collectively form a tube bonded to the rod end. The bonding agent seals the inserts to the rod side surfaces and to each other, but not to the casing wall. Such inserts can be made from molded plastic, preferably containing non-metallic fibrous filler. The fitting has a closed end opposite the open end, which closed end may have a connector in the form of a threaded portion or the like for connection with a female coupling. Release pins can also secure the connector to the coupling. A forwardly projecting collar of reduced diameter at the open front end of the casing reduces pinch-off.

The collar can be tapered or of uniform thickness. In one embodiment, previously formed inserts are used and terminate in a front flange or rim which permits the preformed inserts to be pulled forward relative to the casing, thus tightening them about the sucker rod during bonding of the inserts thereof. In another embodiment, the rear end of the casing has a longitudinal channel extending therethrough into contact with the inner end of the cavity. A pusher rod is seated in the channel with its expanded head in the rear end of the cavity behind and bearing against the rear ends of the inserts. The inserts are forced tightly against the sucker rod by pushing the pusher rod thereagainst.

The assembly is simple, effective and durable and can be fabricated rapidly and inexpensively.

Further features of the present invention are set forth in the following detailed description and accompanying drawings.

DRAWINGS

FIG. 1:

FIG. 1 is a schematic fragmentary perspective view, partly broken away, of a first preferred embodiment of the improved sucker rod assembly of the present invention;

FIG. 2:

FIG. 2 is a longitudinal cross-section of the casing portion of sucker rod of FIG. 1;

FIG. 3:

FIG. 3 is a schematic front elevation of the casing of FIG. 2;

FIG. 4:

FIG. 4 is a schematic side elevation of the casing of FIG. 2;

FIG. 5:

FIG. 5 is a schematic perspective view partly broken away, of a second preferred embodiment of the improved sucker rod assembly of the present invention; and,

FIG. 6:

FIG. 6 is a schematic front elevation of the inserts used in the embodiment of FIG. 5; and,

FIG. 7:

FIG. 7 is a schematic fragmentary perspective view, partly broken away, of a third preferred embodiment of the improved sucker rod assembly of the present invention.

DETAILED DESCRIPTION

Figure 1:
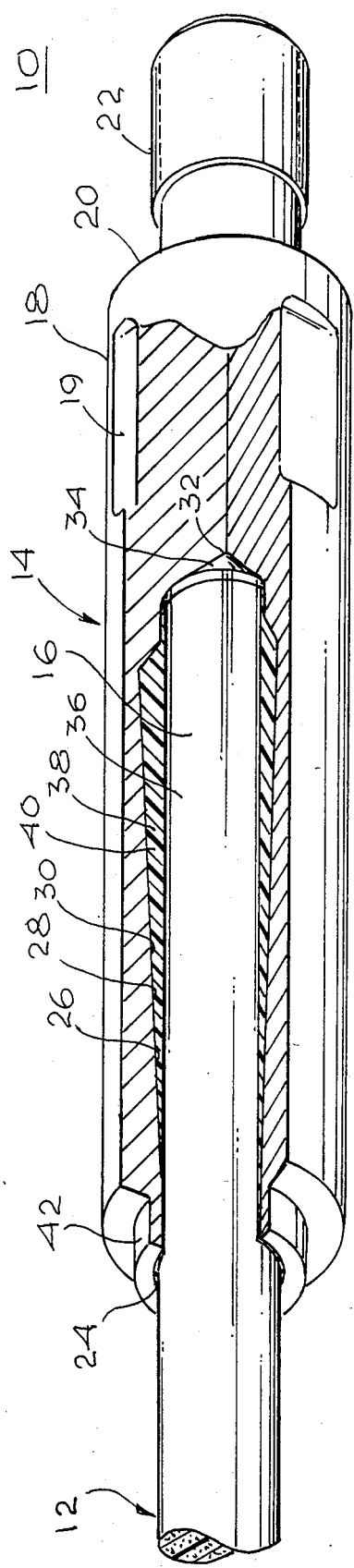

FIGS. 1–4:

Now referring more particularly to FIG. 1 of the accompanying drawings, a first preferred embodiment of the improved sucker rod assembly of the present invention is schematically depicted in perspective view. Thus, assembly 10 is shown which comprises a cylindrical sucker rod 12 of any suitable material, for example, metal, fiberglass, plastic, carbon or graphite fibers, boron fibers or any suitable combination thereof, together with a pair of end fittings 14, only one of which is shown in FIG. 1. Fittings 14 are disposed on the opposite ends 16 of sucker rod 12.

Each fitting 14 comprises an elongated tubular casing 18 of metal, such as stainless steel, tool steel, etc. or other suitable material having spaced flat portions 19 to facilitate the use of a wrench or other tool, and a closed end 20 bearing connector means such as a threaded end portion 22 which enables fittings 14 to be releasably secured to threaded female couplings (not shown) for interconnection with other similar sucker rod assemblies (not shown) in a sucker rod string (not shown). Thus, assembly 10 is intended for use as one of a number of such assemblies in a sucker rod string interconnected to, for example, a downhole well pump (not shown) and also to pump motive means (not shown) above the well. Sucker rod 12 may be, for example, 25–40 feet in length, although other lengths are also possible.

Figure 2:
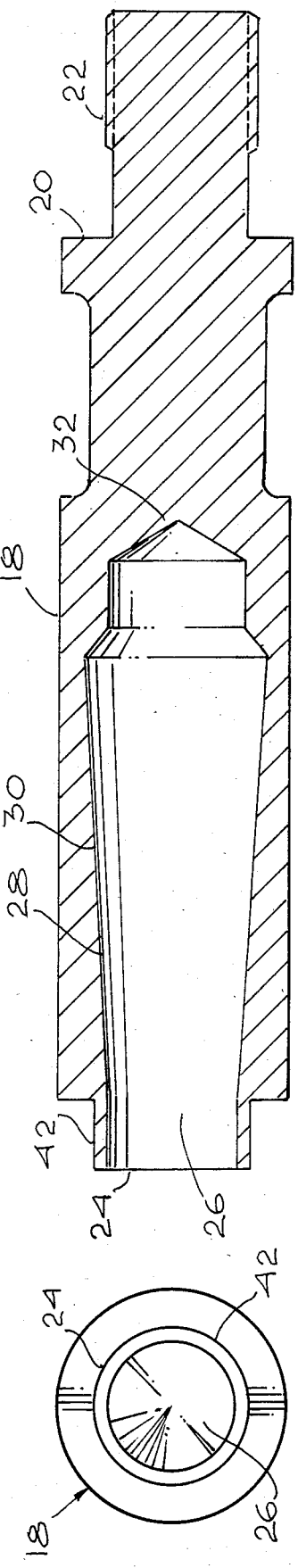
Figure 3:
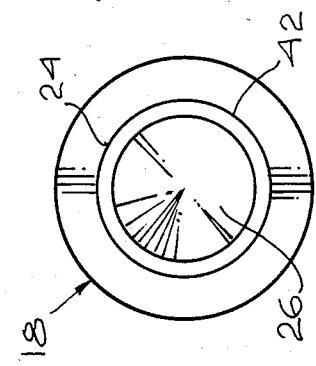
Figure 4:
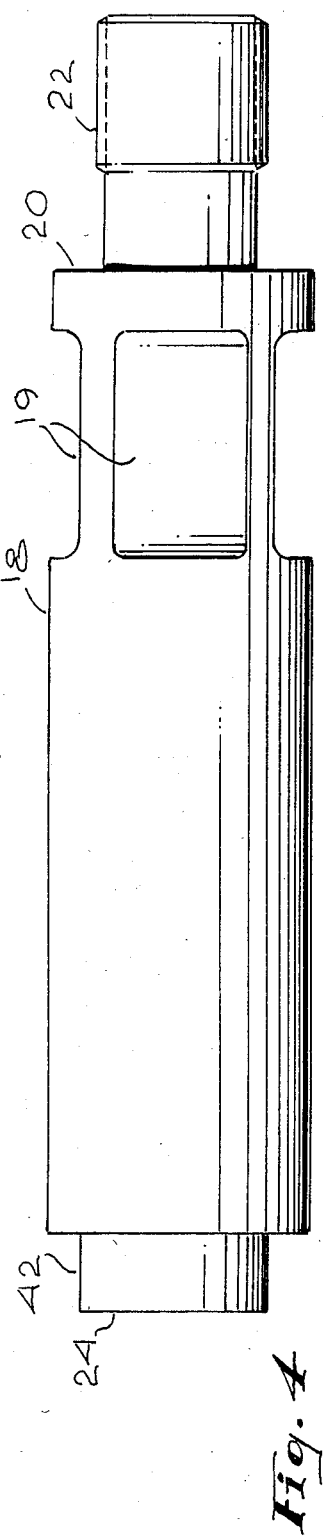

Casing 18 includes an open opposite end 24 communicating with an internal cavity 26 which extends longitudinally through the center of casing 18, as shown in FIGS. 1 and 2. Cavity 26 is defined by the inner surfaces 28 of casing 18. The side portions 30 of surfaces 28 define cavity 26 as annular, elongated, tapered, frustoconical and wedge-shaped, being tapered down from its inner end 32 to front end 24 of casing 18. Inner surfaces 28 terminate at a closed inner end 32 in a cone-shaped configuration and the tip 34 of rod 12 may be similarly shaped so that it seats into end 32 to properly center it in cavity 26. Normally, however, other alignment means are provided.

Rod end 16, when inserted in cavity 26, as shown in FIG. 1, so that it is centered therein has its side portions 36 define with side portions 30 of surfaces 28 a single, annular, elongated, generally frusto-conical, tapered, wedged-shaped space 38 in which is disposed anchoring component 40 filling space 38. In the embodiment of FIG. 1, anchoring component 40 comprises a potting agent preferably in the form of plastic, such as epoxy resin with amine catalyst which has been poured into space 38 with rod end 16 in place and then allowed to set to a hardened anchoring condition. A sufficient amount of such material is used to fill space 38 and bond securely to sides 36 of rod end 16. The potting material may also bond to side portions 30 of surfaces 28. However, if desired, surfaces 28 can be first coated with a liquid mold release agent or the like, for example, polydimethyl siloxane or other silicone resin in solution and such mold release agent can be set in place to a solid state at about 250° F. or the like before the potting material is poured into space 38 to form anchoring component 40. In that instance, anchoring component 40 does not bond to surfaces 28.

Upon setting of the potting material to form anchoring component 40, assembly 10 is complete. It will be noted that assembly 10 includes a narrow collar 42 projecting forwardly from the front end 24 of casing 18 and integral therewith. Collar 42 helps prevent pinch-off of rod 12 at front end 24 as rod 12 flexes during use in a sucker rod string. With fittings 14 in place at the two opposite ends of rod 12 and anchored thereto by component 40, assembly 10 is ready for interconnection through threaded portions 22 and female couplers (not shown) to similar assemblies 10 to form a sucker rod string of desired length. Assembly 10 is durable, inexpensive and efficient, fittings 14 staying in place around rod ends 16 without crushing those ends.

FIGS. 5–6:

A second preferred embodiment of the improved sucker rod assembly of the present invention is schematically depicted in FIGS. 5 and 6 of the accompanying drawings. Thus, assembly 10a is shown, particularly in FIG. 5, in schematic perspective view. Components of assembly 10a which are similar to those of assembly 10 bear the same numerals but are succeeded by the letter "a". Thus, assembly 10a includes a sucker rod 12a which, as shown by reference to the central opening in FIG. 6, is oval in transverse cross-section and is elongated. Fittings 14a are disposed on opposite ends 16a of rod 12a.

Each fitting 14a comprises an elongated tubular casing 18a. Casing 18a is adapted for use on a continuous sucker rod 12a and differs from casing 18 only in a few respects. Thus closed end 20a includes an elongated rod 70 having a cone-shaped nose 72 seated in a cavity 74 in a similar coupling 76. Casing 18a is releasably secured to coupling 76 by removable pins 78 and 80 disposed at right angles to each other in aligned passageways 82 and 84, respectively, extending through rod 70 and coupling 76. Casing 18a includes open end 24a, collar 42a and interior surfaces 28a defining cavity 26a. Space 38a is similar in shape to space 38 and is defined by side portions 30a and 36a.

Anchoring component 40a comprises four inserts 86 which collectively fill space 38a, as shown in FIG. 5 and which extend forwardly of collar 42a terminating in peripheral flanges 88 which, together with the front end of collar 42a define an annular space 90. The four inserts 86 join each other along longitudinally extending junction lines 92 to define a central passageway 94 in which rod end 16a is received. Inserts 86 can be fabricated of any suitable material, including metal but most preferably are fabricated by molding a high temperature thermoplastic or thermosetting material, for example, a thermoplastic such as polysulfone, polyethersulfone, polyetherimide or polyphenylene sulfide. Preferably, the plastic material is filled with fiberglass, graphite or carbon fibers. A suitable thermosetting plastic could be used, such as phenolic resin or the like. Epoxies, polyesters and other thermosetting plastics could also be used. Preferably, the plastic in molten form is injected into a mold and set to the desired shape so that the plurality of inserts 86 will completely fill space 38a when in position, as shown in FIG. 1 and FIG. 6.

Before inserts 86 are placed in space 38a, it is preferred to coat inner surfaces 28a with a liquid mold release agent, as previously described in connection with the fabrication of assembly 10, then causing the release agent to set in place, after which inserts 86 can be fitted into space 38a. Before rod end 16a is inserted in passageway 94, an adhesive (not shown) such as high temperature resistant epoxy resin thermosetting adhesive or the like containing a catalyst is placed into passageway 94 in a suitable concentration so that it will spread out into a thin bond layer of approximately 0.005–0.015 inch in thickness over sides 36a so as to bond inserts 86 firmly thereto when set. The assembly is then heated to liquify the adhesive. Other bonding thicknesses can be used but it has been found that a thin uniform bonding layer of adhesive such as is described above is far stronger and more tenaciously bonds inserts 86 to side portions 36a than do thicker bonds. Such adhesive may also fill juncture lines 92 to cause inserts 86 to form a unitary structure.

As rod end 16a passes into passageway 94, the adhesive therein uniformly coats sides 36. While the adhesive is kept liquid, inserts 86 are forced tightly against sides 36a, preferably by gripping inserts 86 by a tool (not shown) placed in space 90 and pulled forward of casing 18a. The wedge-shaped contour of side portions 30 and the exterior surfaces of inserts 86 automatically bias inserts 86 toward sides 36a when this pulling is carried out. The biasing is continued until the adhesive permanently bonds inserts 86 to sides 36, whereupon the pulling can be discontinued. Although the adhesive may set in a short while, e.g. 1–5 minutes, the biasing force and heat can be maintained until the bond is cured, e.g. 45–60 minutes. The result is end 16a firmly anchored into casing 18a through inserts 86 bonded to end 16a but not to casing 18a. The previously described biasing is achievable because inserts 86 are not bonded to casing 18. Therefore, the thickness of the adhesive layer between sides 36 and inserts 86 can be easily controlled during the biasing procedure. Upon setting of the adhesive, assembly 10a is complete. It will be understood that the same procedure occurs at both ends 16a of rod 12a utilizing identical end fittings 14a. Assembly 10a exhibits improved strength and is easier and less expensive to produce than conventional sucker rod assemblies.

FIG. 7:

A third preferred embodiment of the improved sucker rod assembly of the present invention is schematically depicted in FIG. 7 of the accompanying drawings. Thus, assembly 10b is shown. Components thereof which are similar to those of assembly 10 or 10a bear the same numerals but are succeeded by the letter "b". Thus, assembly 10b includes a sucker rod 12b which is circular in transverse cross-section and is elongated. Fittings 14b are disposed on the opposite squared off ends 16b of rod 12b.

Each fitting 14b comprises an elongated tubular casing 18b. Casing 18b has spaced flat portions 19b and a generally closed end 20b bearing a threaded end portion 22b. The open opposite end 24b of casing 18b communicates with internal cavity 26b extending through the center of casing 18b and defined by side portions 30b of internal surfaces 28b and inner end 32b which may be flat. When rod 12b is centered in cavity 26 so that it abuts end 32b or lies closely thereto, wedge-shaped space 38b is between rod 12b and casing 18b. It is in space 38b that there are disposed components of anchoring element 40b comprising four inserts 86b which collectively substantially fill space 38b and which terminate at collar 42b of casing 18b. It will be noted that collar 42b is tapered or necked down gradually to a relatively thin walled front end. It will also be noted that a pusher 100 is disposed behind inserts 86b in space 38b. Pusher 100 comprises a ring 102 adapted to receive end 16b of rod 12b, which ring 102 is connected by an end wall (not shown) to a longitudinally extending pusher rod 104 disposed in a central passageway 106 extending from cavity 26b to the rear end 22b of casing 18b. Pusher 100 can be fabricated of metal, plastic, cermet, or any other suitable material and is dimensioned so as to freely slide within passageway 106 and cavity 26b.

When it is desired to assemble assembly 10b, pusher 102 is first placed in cavity 26b from the front end 24b thereof so that rod 104 lies in passageway 106. The procedure specified above for assembling assembly 10a is thereafter generally followed, including the use of a mold release agent on surfaces 28b, setting of the agent, fitting of inserts 86b into space 38b, adding an adhesive to passageway 94b, inserting end 16b of rod 12b therein, etc. However, instead of pulling inserts 86b forward, they are pushed forward. Thus, a tool (not shown) is placed in space 106 behind rod 104 and driven forward against rod 104 so that ring 102 shoves inserts 86b forward and tightly against the exterior of rod 12b causing it to bind tightly thereagainst. It will be noted that no flange similar to flange 88 of assembly 10a is required, since inserts 86b are pushed forward rather than pulled forward. The forward biasing of those inserts is continued until the adhesive firmly bonds inserts 86b to rod 12b, whereupon the biasing force is removed. Inserts 86b permanently lock rod end 16b in place in casing 18b, with pusher 100 also permanently in position in casing 18b.

It will be understood that the inserts 86 and 86b used in, respectively, assembly 10a and assembly 10b can be fabricated with any suitable single wedge-shaped configuration as can the set potting material which comprises the anchoring component 40 of FIG. 1. Moreover, sucker rods 12, 12 and 12b can have a different cross-sectional configuration than those previously described. Various other modifications, changes, alterations and additions can be made in the improved sucker rod assembly of the present invention, its components and their parameters. All such modifications, changes, alterations and additions as are within the scope of the appended claims form part of the present invention.

What is claimed is:

1. An improved sucker rod assembly comprising, in combination:

a. a sucker rod; and b. a pair of fittings secured to opposite ends of said rod, each said fitting including
  i. a rigid elongated casing having interior surfaces defining an open front end and cavity extending rearwardly from said open front end in which cavity one end of said sucker rod is disposed, the side portions of said interior surfaces being contoured to define, with the side portions of said sucker rod end a single, annular elongated tapered wedge-shaped space; and,
  ii. anchoring means filling said space and bonding to the side portions of said rod end to lock said rod end in place, said anchoring means having a narrower diameter at the front end thereof than at about the rear end thereof and being generally frusto-conical, said anchoring means comprising a plurality of separate rigid inserts, the interior surfaces of which collectively define a central elongated passageway in which said rod end is received, said interior surfaces of said inserts being tightly bonded to said side portions of said rod, and said inserts being bonded to each other along the contact lines therebetween to form a unitary structure.

2. The improved assembly of claim 1 wherein said cavity extends along about the longitudinal ceterline of said casing and wherein said anchoring means extends substantially the length of said side portions of said rod end.

3. The improved assembly of claim 1 wherein said inserts are not bonded to the interior surfaces of said casing.

4. The improved assembly of claim 3 wherein said inserts comprise molded plastic.

5. The improved assembly of claim 4 wherein said inserts include fibrous filler.

6. The improved assembly of claim 5 wherein said fibrous filler comprises non-metallic fibers.

7. The improved assembly of claim 1 wherein said sucker rod is substantially non-metallic.

8. The improved assembly of claim 7 wherein said sucker rod comprises fiberglass.

9. The improved assembly of claim 7 wherein said sucker rod comprises fibers selected from the group consisting of graphite fibers, carbon fibers and mixtures, thereof.

10. The improved assembly of claim 7 wherein said sucker rod comprises plastic.

11. The improved assembly of claim 1 wherein said casing is metallic and has a closed connector end opposite said open end.

12. The improved assembly of claim 11 wherein said sucker rod is a continuous sucker rod and wherein said connector end is secured in a female housing.

13. The improved assembly of claim 12 wherein release pins releasably secure said connector end in said female housing.

14. The improved assembly of claim 11 wherein said connector end is threaded.

15. The improved assembly of claim 11 wherein the open end of said fitting includes a forwardly projecting collar of reduced diameter.

16. The improved assembly of claim 15 wherein said collar is of substantially uniform diameter.

17. The improved assembly of claim 15 wherein said collar is tapered down forwardly.

18. The improved assembly of claim 15 wherein said assembly includes a pusher comprising a head disposed behind said inserts in said cavity and a rod connected to said head and disposed in a passageway extending longitudinally through said casing from said cavity to the rear end of said casing.

19. The improved assembly of claim 18 wherein said head is adapted to receive said one end of said sucker rod and bear against the rear end of said inserts for biasing them forward into close contact with the sides of said sucker rod.

20. The improved assembly of claim 19 wherein said pusher comprises rigid plastic slideably received in said cavity and passageway.

* * * * *